(12) United States Patent
Wakonig

(10) Patent No.: US 12,706,561 B2
(45) Date of Patent: Aug. 11, 2026

(54) NOISE CONTROL DEVICE

(71) Applicant: Martin Wakonig, Vienna (AT)

(72) Inventor: Martin Wakonig, Vienna (AT)

(73) Assignee: Martin Wakonig, Vienna (AT)

( * ) Notice: Subject to any disclaimer, the term of this patent is extended or adjusted under 35 U.S.C. 154(b) by 0 days.

(21) Appl. No.: 17/754,619

(22) PCT Filed: Oct. 14, 2020

(86) PCT No.: PCT/AT2020/060369
§ 371 (c)(1),
(2) Date: Apr. 7, 2022

(87) PCT Pub. No.: WO2021/072467
PCT Pub. Date: Apr. 22, 2021

(65) Prior Publication Data

US 2022/0376647 A1 Nov. 24, 2022

(30) Foreign Application Priority Data

Oct. 14, 2019 (AT) .............................. A 50877/2019

(51) Int. Cl.
*E01F 8/00* (2006.01)
*E04B 1/84* (2006.01)
*H02S 20/21* (2014.01)

(52) U.S. Cl.
CPC ............ *H02S 20/21* (2014.12); *E01F 8/0017* (2013.01); *E01F 8/0023* (2013.01); *E01F 8/0029* (2013.01); *E01F 8/0035* (2013.01)

(58) Field of Classification Search
CPC ......... E01F 8/00; E01F 8/0023; E01F 8/0011; E01F 8/0035; E01F 8/0017; E01F 8/0029; H02S 20/21; H02S 20/20; E04B 1/84
See application file for complete search history.

(56) References Cited

U.S. PATENT DOCUMENTS 5,469,932 A * 11/1995 McNair ................. E01F 8/0035 181/210
11,362,616 B2 * 6/2022 Duggal ................... F24S 25/13
(Continued)

FOREIGN PATENT DOCUMENTS

AT 520932 A4 9/2019
CN 202148498 U * 2/2012
(Continued)

OTHER PUBLICATIONS

International Preliminary Report on Patentability for corresponding International Application No. PCT/AT2020/060369 dated Mar. 11, 2021.

(Continued)

*Primary Examiner* — Edgardo San Martin
(74) *Attorney, Agent, or Firm* — Chrisman Gallo Tochtrop LLC

(57) ABSTRACT

The application relates to a noise control device including a substantially vertical wall element, at least one side arm projecting from the wall element, and at least one solar module supported by the side arm, wherein the side arm laterally supports the wall element, wherein the wall element forms a noise control surface above an upper edge of the solar module; as well as a noise control system including a noise control device of this type and an additional wall element spaced apart from same, which has an additional noise control surface and an additional solar module, wherein a height difference between the lower edge of the solar module of the noise control device and an upper edge of the additional wall element is less than or equal to 0.6 times the horizontal distance between the edges, and/or a height difference between a lower edge of the additional solar module and an upper edge of the noise control device
(Continued)

is less than or equal to 0.6 times the horizontal distance between the edges.

23 Claims, 8 Drawing Sheets

(56) References Cited

U.S. PATENT DOCUMENTS

| | | | | |
|---|---|---|---|---|
| 2018/0254736 | A1 | 9/2018 | Duggal | |
| 2021/0359637 | A1* | 11/2021 | Wakonig | E01F 8/0023 |
| 2022/0034052 | A1 | 2/2022 | Wakonig | |
| 2022/0393641 | A1* | 12/2022 | Yang | H02M 7/53871 |

FOREIGN PATENT DOCUMENTS

| | | | | | |
|---|---|---|---|---|---|
| CN | 205223880 | U | | 5/2016 | |
| CN | 206132122 | U | | 4/2017 | |
| CN | 106836539 | A | | 6/2017 | |
| CN | 107724266 | A | | 2/2018 | |
| CN | 108560433 | A | * | 9/2018 | |
| CN | 108824246 | A | * | 11/2018 | E01F 8/00 |
| CN | 208830185 | U | | 5/2019 | |
| DE | 4417065 | A1 | | 1/1995 | |
| DE | 19645683 | A1 | * | 5/1998 | E01F 8/0029 |
| DE | 103 27 762 | A1 | | 1/2005 | |
| DE | 20 2009 015 905 | U1 | | 4/2010 | |
| DE | 202010011517 | U1 | * | 1/2011 | E01F 8/0005 |
| DE | 10 2009 039 736 | A1 | | 3/2011 | |
| DE | 202011004458 | U1 | * | 6/2011 | E01F 8/0023 |
| EP | 0784123 | A1 | * | 7/1997 | |
| EP | 1788155 | A2 | * | 5/2007 | E01F 8/0005 |
| EP | 4053341 | A1 | * | 9/2022 | |
| FR | 2 455 127 | A1 | | 11/1980 | |
| IT | MI20100853 | A1 | | 11/2011 | |
| JP | 2005126930 | A | * | 5/2005 | F24S 25/10 |
| KR | 2000-0050122 | A | | 8/2005 | |
| KR | 10-2009-0013337 | A | | 2/2009 | |
| KR | 20090013336 | A | * | 2/2009 | |
| KR | 20090013337 | A | * | 2/2009 | E01F 8/0064 |
| KR | 20100000810 | A | * | 1/2010 | |
| KR | 20150028874 | A | * | 3/2015 | H02S 20/21 |
| KR | 10-2017-0141449 | A | | 12/2017 | |
| KR | 101845295 | B1 | * | 4/2018 | |
| KR | 102003376 | B1 | * | 7/2019 | H02S 20/21 |
| KR | 102018560 | B1 | * | 9/2019 | |
| KR | 200489669 | Y1 | * | 10/2019 | |
| KR | 102149487 | B1 | * | 8/2020 | |
| KR | 20210007432 | A | * | 1/2021 | |
| KR | 102314624 | B1 | * | 10/2021 | |
| KR | 102314625 | B1 | * | 10/2021 | E01F 8/0017 |

OTHER PUBLICATIONS

International Search Report for corresponding International Application No. PCT/AT/2020/060369 mailed Jan. 12, 2021.

Written Opinion for corresponding International Application No. PCT/AT/2020/060369 dated Jan. 12, 2021.

Office Action dated May 31, 2020 for corresponding Austrian Application No. 50877/2019.

Office Action issued in corresponding Chinese application, 202080071905.1, dated Mar. 16, 2023.

Chinese Office action for related Application No. 202080071905.1, dated Sep. 11, 2024.

Peng Hong et al., “Building Materials”, pp. 182-183, Chongqing University Press, Jan. 2018.

China State Intellectual Property Office, “Notification of Third Review Observations”, Application No. 202080071905.1, dated Apr. 29, 2024.

* cited by examiner

NOISE CONTROL DEVICE

CROSS-REFERENCE TO RELATED APPLICATIONS

This is a National Stage application of PCT international application PCT/AT2020/060369 filed on Oct. 14, 2020, which claims the priority of Austrian Patent Application No. A50877/2019, filed Oct. 14, 2019, which are incorporated herein by reference in their entireties.

FIELD OF THE INVENTION

The invention relates to a noise protection device comprising a substantially perpendicular wall element, at least one outrigger emanating from the wall element and at least one solar module supported by the outrigger, wherein the outrigger laterally supports the wall element, as well as a noise protection system comprising such a noise protection device.

BACKGROUND OF THE INVENTION

A generic noise protection device is known from DE 20 2009 015 905 U1. However, this has the aim that the supporting structure for the solar modules extends as far as the upper end of the perpendicular noise protection wall so that noise from the direction of a noise-emitting source, e.g. from a motorway or a railway track is deflected over the noise protection wall.

DE 103 27 762 A1 discloses a multipurpose bridge railing as a common mounting for noise protection panels on the one hand and for solar module panels on the other hand. In this case, the supporting properties of the horizontally and vertically aligned struts of the safety railings are additionally used. On the one hand, for the mounting for noise protection walls and on the other hand, for the mounting for solar cell walls or modules. In detail, it is proposed that the solar cell walls on the bridge railings on the side facing the sun and the noise protection walls on the side facing away from the sun and facing the traffic run at an angle towards one another at an angle of inclination which can be freely selected.

KR 20170141449 A discloses a sound proof panel. An inclined support panel is provided between an existing sound proof panel that is installed on a road or a railway track and an inclined surface which is disposed on the rear side of the sound proof panel to hold the sound proof panel stably. A solar cell panel can be mounted on the inclined support panel.

FR 2455127 discloses a combined solar energy collector and sound proofing unit comprising a plurality of flat panels, wherein the flat panels form diamond-shaped prims which are inclined obliquely to optimize energy acquisition and sound reflection.

BRIEF SUMMARY OF THE INVENTION

It is the object of the invention that less noise is deflected over the wall. Such a deflection is disadvantageous, for example, in hilly or mountainous terrain because then the noise crossing over the noise protection wall even increases compared to a situation without a noise protection device.

The invention provides a noise protection device of the type mentioned initially, wherein the wall element forms a noise protection surface above an upper edge of the solar module. Thus, a part of the sound deflected by the solar module is deflected into the noise protection surface and is diverted, scattered, absorbed there or a combination thereof. For example, in the case of an arrangement of the solar modules on a side of the noise protection device facing the noise, a reduction in the noise deflected over the wall can be achieved.

With a view to the optimal utilization of the solar modules, the noise protection surface can extend substantially perpendicularly upwards starting from the upper edge of the solar module. The shading of the solar modules is thus as small as possible.

Furthermore, the height of the noise protection surface above the upper edge of the solar module can be at least as great as a perpendicular distance between a lower edge of the solar module and the upper edge of the solar module. For example, this height can be approximately twice as great as the said distance. Here use is made of the fact that the outrigger or outriggers can absorb lateral loads on the wall element. Such lateral loads are, for example, wind loads. These frequently define the maximum installation height of a noise protection wall. Consequently, as a result of the outrigger provided and the statics thereby achieved, the upper edge of the wall element can reach a greater height than the upper edge of a conventional noise protection wall. Other solutions for this problem such as the combination with noise protection insulation and/or the reinforcement of the uprights (or the construction in general) and foundations are considerably more expensive than the present disclosure.

According to one exemplary embodiment, the at least one outrigger can enclose an angle of about 60° with a principal plane of extension of the at least one wall element. This angle corresponds to an inclination of the solar modules carried by the outrigger of about 30° from a horizontal. This arrangement enables a particularly favourable use of the incident solar energy.

Optionally the noise protection device can comprise at least two outriggers emanating from the wall element, wherein the outriggers support the wall element on both sides, wherein optionally the outriggers support solar modules on both sides of the wall element. In this way, a particularly stable support of the wall element can be achieved to both sides (under tensile and pressure loading of the outriggers) and at the same time a particularly efficient utilization of area for solar energy recovery of an otherwise frequently underused area in the immediate vicinity of noise-generating traffic areas.

Alternatively or additionally, at least one of the outriggers can comprise a strut to a foot of the wall element, wherein the strut optionally emanates from a centre of the outrigger. The strut on the one hand relieves the load on the outrigger from its own weight and on the other hand, makes it possible to absorb weight loads as a result of solar modules carried by the outrigger.

Furthermore, the wall element can carry at least one additional solar module in the region of the noise protection surface. With the at least one additional solar module the area above the solar module carried by the outrigger can also be utilized for energy recovery. As a result of the arrangement on the perpendicular noise protection surface, for example, the additional solar modules can be efficiently used primarily in the morning and evening hours.

In this context, according to a further exemplary embodiment, the wall element can have a profile element in the region of the noise protection surface, wherein the profile element comprises a body and has at least one outer side, wherein the body has a support towards the at least one outer side, wherein the at least one additional solar module is disposed on the support and is connected to the body, wherein the additional solar module is inclined in relation to a vertical in the direction of an upper side of the profile element, wherein on the at least one outer side the body has at least one sound absorption surface which can be reached directly for incoming sound, wherein the sound absorption surface, at least in sections, is inclined in relation to the vertical and/or in relation to a longitudinal direction of the profile element, wherein the area of the sound absorption surface is at least as large as the area of an elevation view of the profile element. The sound absorption surface here is that part of the surface of the profile element on the outer side of which far from the surface of the at least one additional solar module which can be reached directly for incoming sound, i.e. without necessary preceding reflection or deflection of the sound. Parts of the surface of the profile element concealed by an additional solar module for incoming sound therefore cannot be ascribed to the sound absorption surface. The area of the elevation view of the profile element corresponds to the area of an outline of the profile element in a side view of the outer side. More precisely the area of the elevation view of the outer side is therefore meant, i.e. in the viewing direction normal to the vertical and normal to a longitudinal extension of the profile element onto the at least one outer side. As a result of the inclination of the sound absorption surface at least in sections, the area thereof is larger than the area of its own elevation view. The relative difference between the two areas depends on the angle of inclination. At an angle of inclination of 45°, the ratio of visible area to surface area is approximately 1:1.4 (1 to square root of 2). From this it follows that if approximately 71% of the visible area is formed by sound absorption surfaces inclined by 45° and the additional solar modules occupy the remaining 29% of the visible area, the area of the sound absorption surface is at least as large as the area of the elevation view of the profile element. The outer side can be a side facing the sound. The vertical is in this case that axis which extends between the underside and the upper side of the profile element. The designation as "vertical" is not restrictive for the use of the profile element which accordingly can also be used for obliquely erected Wall elements without departing from the subject matter of claim 8. In the case of a typically vertically erected core of a noise protection device comprising the wall elements and profile elements described here, the vertical corresponds to the absolute vertical of the noise protection device. The vertical is, for example, normal to a longitudinal direction of the profile element. The visible area as defined above then corresponds to the area of a projection of the profile element into a plane spanned by the vertical and the longitudinal direction.

The incoming sound (sound immission) reaches the sound absorption surface directly but not necessarily horizontally (normal to the vertical). Since most of the sound immission is expected from a relatively small range of the solid angle, the area of those sections of the sound absorption surface which can be reached directly for sound arriving from a noise immission range is (overall) at least as large as the area of an elevation view of the profile element, wherein the noise immission range comprises an angular range between a normal to the vertical and an inclination set at 70° from this normal in the direction of an underside of the profile element. Optionally the above condition can be satisfied for the area of the sections of the sound absorption surface in the case of a noise immission range having an angular range between a normal to the vertical (hereinafter this normal is for brevity designated as 0°) and an inclination erected at 60° from this normal in the direction of an underside of the profile element or with an angular range between 0° and 50° or with an angular range between 0° and 40° or with an angular range between 0° and 30° or with an angular range between 0° and 20° or with an angular range between 0° and 10°.

The area of the sound absorption surface can correspond to approximately 1.2 times or multiple times the area of an elevation view of the profile element. As a result of the larger sound absorption surface, the sound absorption properties of the profile element are further improved and with given absorber material, e.g. of the body, a better degree of sound absorption can be achieved (i.e. more sound or sound energy is absorbed). Optionally the area of those sections of the sound absorption surface that can be reached directly for sound incoming from the noise immission range can correspond (overall) to at least 1.2 times the area of an elevation view of the profile element.

Furthermore, the body can comprise an upper bearing surface and a lower bearing surface for stacking a plurality of profile elements in a stacking direction, wherein the bearing surfaces are arranged at least partially substantially normal to the vertical. The bearing surfaces make it possible to achieve an adjacent arrangement of a plurality of profile elements in the direction of the vertical so that a noise protection device of different height can be formed depending on the number of rows of profile elements.

According to a further exemplary embodiment, the sound absorption surface in a viewing direction normal to the additional solar module can be concealed by the additional solar module at least for the most part. Assuming that light is incident normally to the additional solar module (corresponds to the optimal efficiency), the sound absorption surface then lies at least for the most part in the shadow of the additional solar module. This arrangement of the additional solar module and the sound absorption surface enables a particularly high usage of the incident solar energy. In this case, it is irrelevant whether the sound absorption surface lies through a solar module of the same profile element or a neighbouring or adjacent profile element arranged along the vertical thereover.

Optionally the sound absorption surface of a noise protection wall embracing the profile element can be disposed completely within a shadow line between an upper edge of a lower additional solar module and a lower edge of an upper additional solar module. In this way, it can be avoided that the profile of the sound absorption surface adversely influences the efficiency of the additional solar modules by shading.

In this context, according to a special embodiment, the body can have at least one elevation to enlarge the sound absorption surface on the at least one outer side outside the additional solar module, wherein an outer edge of the elevation contacts the shadow line or lies inside the shadow line. With such an elevation, the space within the shadow line can be optimally utilized to enlarge the sound absorption surface without adversely affecting the efficiency of an additional solar module (of the same or an adjacent profile element) possibly arranged thereunder.

Alternatively or additionally, the distance between adjacent additional solar modules of a noise protection device comprising the profile element in the direction of the vertical can be selected so that the shadow line between these additional solar modules is disposed substantially normally on the front side of at least one additional solar module. In this arrangement, assuming that light is incident normally onto the additional solar module (corresponds to the optimal efficiency), the upper additional solar module does not cast any shadow on the lower additional solar module. Thus, an optimal usage of the available photovoltaic area can be achieved.

Furthermore, in a side view of the outer side the distance between adjacent solar modules in the direction of the vertical can be greater than or equal to the distance between an upper edge and a lower edge of an additional solar module. In other words, in this configuration, the additional solar modules occupy 50% or less of the elevation view. As a result, very flat angles of inclination (less than 30°) of the sound absorption surface and accompanying this very pointed edges (enclosed angle less than 60°) can be avoided which could have a restrictive effect on the material choice for the body without endangering its structural integrity.

The noise protection surface can be configured, for example, as a sound absorption surface. By this is understood that the sound pressure level of the sound reflected or deflected from the sound absorption surface is, for example, at least 4 dB less than the sound pressure level of the sound impinging upon the sound absorption surface.

The body of the profile element in the region of the noise protection surface can, for example, substantially consist of a sound-absorbing material. The sound-absorbing material can be suitable for forming a support structure for the additional solar module. Sound-absorbing material is understood here to be a material having a degree of sound absorption of, for example, at least 4 dB. The sound-absorbing material can, for example, be wood concrete. Within the scope of the present disclosure the body can also consist of another sound-absorbing material such as, for example, perforated concrete.

As mentioned initially, the invention further relates to a noise protection system comprising: a noise protection device according to one of the variants described above and an additional wall element with an additional noise protection surface and an additional solar module, wherein the noise protection surface of the noise protection device and the additional noise protection surface are arranged substantially perpendicularly, wherein the additional wall element is disposed at a distance from the noise protection device, wherein a height difference between a lower edge of the solar module of the noise protection device and an upper edge of the additional wall element is less than 0.6 times or equal to 0.6 times the horizontal distance between the same edges and/or a height difference between a lower edge of the additional solar module and an upper edge of the noise protection device is less than 0.6 times or equal to 0.6 times the horizontal distance between the same edges. The additional wall element, the additional noise protection surface and the additional solar module can also be part of an additional noise protection device according to one of the variants described above. The height difference and the horizontal difference between two edges in a plane of intersection substantially normal to the two edges is meant in this case. Horizontal distance is understood here as that distance which corresponds to the horizontal projection of the distance between the two edges in this plane of intersection. It has been found that the relationship specified above between the height difference and the horizontal distance on average over various alignments of the elements (e.g. on an east-west axis or on a north-south axis and any oblique alignment in between) achieves an optimal efficiency of the solar modules. The horizontal distance i.e. substantially the smallest distance between the devices is predefined in practice, for example, by a road width. The horizontal distance can, for example, be between 5 m and 30 m, which results in (maximum) height differences between 3 m and 18 m. With this structure any shading of the solar modules at an angle of incidence of the sunlight of at least 30° over the horizon is avoided.

Furthermore, in this context the larger of the two height differences can approximately correspond to 0.6 times the associated horizontal distance. In this case, with an angle of incidence of the sunlight of 30° over the horizon and corresponding substantially complete provision of the noise protection devices with solar modules, the entire sunlight otherwise incident on the ground surface of the noise protection system including the surfaces delimited by the noise protection system, is used to generate electrical energy.

BRIEF DESCRIPTION OF THE DRAWINGS

The invention will be explained in further detail hereinafter with reference to exemplary embodiments to which it should not be limited however and by reference to the drawings. The drawings show in detail.

DESCRIPTION OF EXAMPLE EMBODIMENTS

Figure 1:
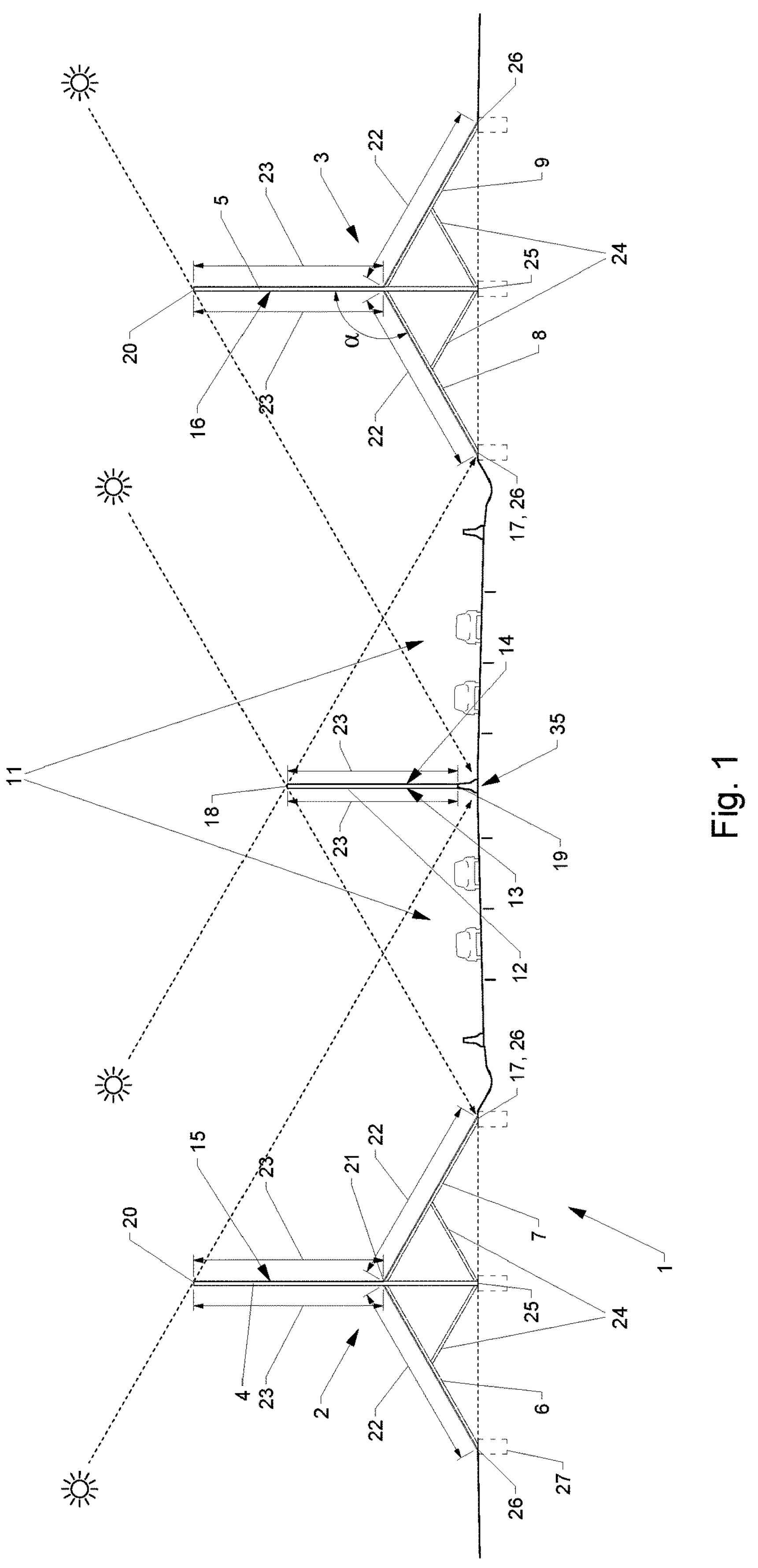
FIG. 1 shows schematically a case of application with two noise protection devices according to the present disclosure on two outer edges of a motorway and a lower noise protection wall between the carriageways.

FIG. 1 shows a noise protection system 1 comprising two noise protection devices 2, 3 with substantially perpendicular wall elements 4, 5 and a lower noise protection wall 35. The noise protection devices 2, 3 each have outriggers 6-9 emanating from the respective wall element 4, 5 on both sides, which laterally support the wall elements 4, 5 on both sides. The outriggers 6-9 enclose an angle $\alpha$ of about 60° with a principal plane of extension of the respectively assigned and supported wall element 4, 5. Solar modules 10 are carried on all the outriggers 6-9, i.e. on both sides of the wall elements 4, 5 (cf. FIG. 2).

The arrangement of the outriggers 6-9 in relation to the wall heights taking into account the self-shading of neighbouring walls, e.g. along carriageways 11, taking into account the wall surfaces is suitable for energy recovery, e.g. by means of photovoltaics. The lower noise protection wall 35 corresponds to an additional wall element 12 with additional noise protection surfaces 13, 14 and additional solar modules. The noise protection surfaces 15, 16 of the noise protection devices 2, 3 and the additional noise protection devices 13, 14 are arranged substantially perpendicularly. The additional wall element 12 of the lower noise protection wall 35 is arranged at a distance from each of the two noise protection devices which corresponds to the width of the carriageways 11 of a two-lane motorway with hard shoulders. In this case, a height difference between a lower edge 17 of the solar modules of the respective noise protection device 2, 3 supported by the inner outriggers 7, 8 and an upper edge 18 of the additional wall element 12 approximately corresponds to 0.6 times the horizontal distance between the same edges 17, 18 and a height difference between a lower edge 19 of the additional solar module and an upper edge 20 of the respective noise protection device 2, 3 approximately corresponds to 0.6 times the horizontal distance between the same edges 19, 20.

The wall elements 4, 5 form a noise protection surface 15, 16 above an upper edge 21 of the solar modules 10 supported by the outriggers 6-9. The noise protection surfaces 15, 16 each extend substantially vertically upwards starting from the upper edge 21 of the solar modules 10. The height of the noise protection surfaces 15, 16 above the upper edge 21 of the solar modules 10 is approximately twice as great as a perpendicular distance between a lower edge 17 of the solar module 10 and the upper edge 21 of the solar module 10. The length 22 of the outriggers which determines the depth or width of the solar modules 10 carried thereby is approximately equal to the height 23 of the noise protection surfaces 15, 16 above the upper edge 21 of the solar modules 10. The outriggers 6-9 enclose an angle of about 60° in each case with a principal plane of extension of the wall element 4, 5. The outriggers 6-9 each have a strut 24 to a foot 25 of the wall element 4, 5. The struts 24 start from a centre of the respectively assigned outrigger 6-9. In each case at the foot 25 of the wall elements 4, 5 and at the outer ends 26 of the outriggers 6-9, foundation blocks 27 are inserted in the ground.

Figure 2:
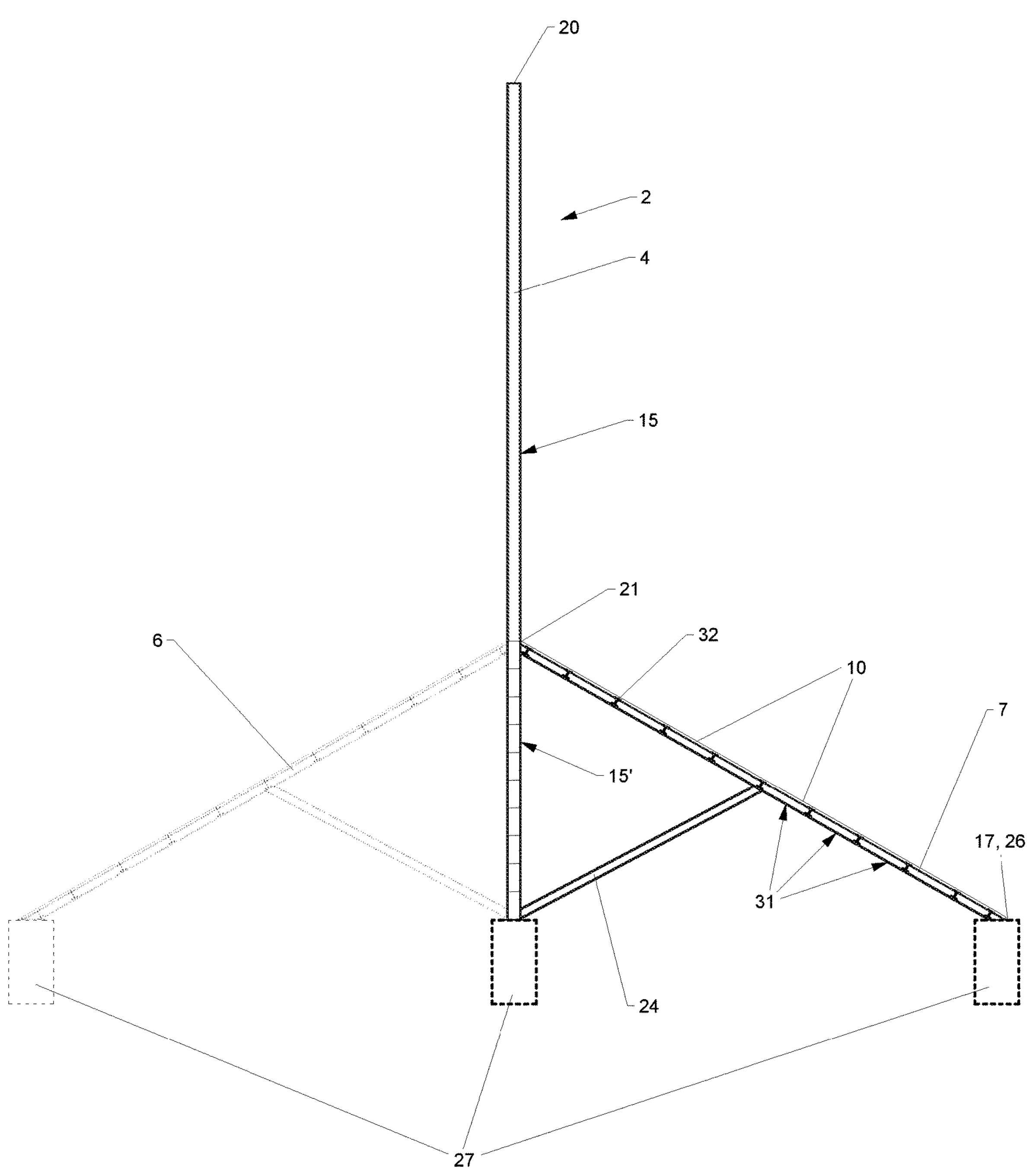
FIG. 2 and FIG. 3 show schematically a system section and a diagrammatic view of a strut of a noise protection wall arranged on one or both sides as a substructure of solar modules.
Figure 3:
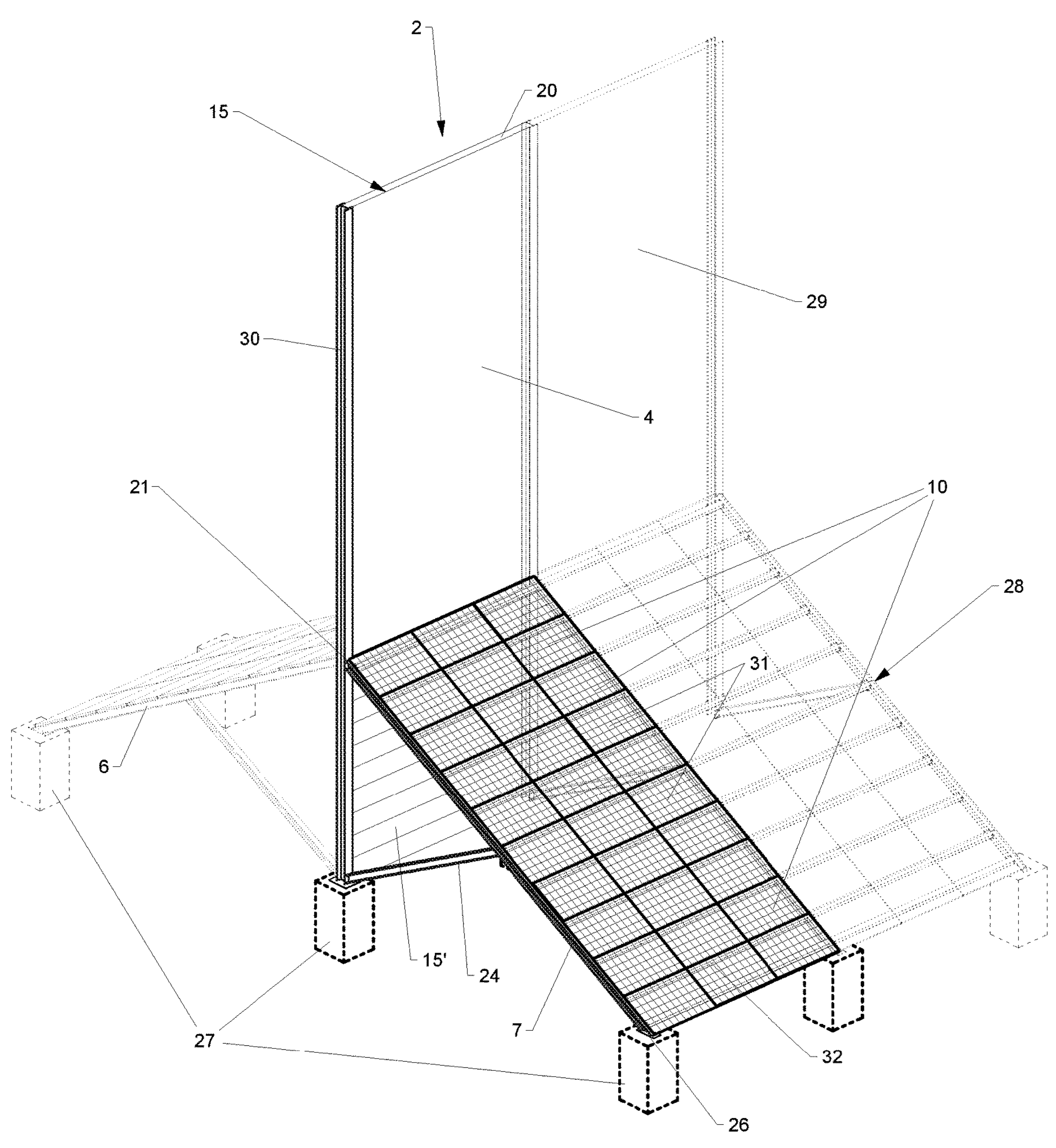

FIG. 2 shows an enlarged view of a single noise protection device 2 and FIG. 3 shows this in a diagrammatic view wherein in each case the same reference numbers as in FIG. 1 are used for the same elements and reference is made to the above description. The noise protection device 2 is shown with a single outrigger 7 on only one side, wherein a second outrigger 6 is indicated by the dashed line as an optional part on the opposite side of the wall element 4. In addition, adjoining the noise protection device 2 an adjacent noise protection device 28 of the same type with an adjoining, adjacent wall element 29 in the plane of the wall element 4 is indicated by a dashed line. The wall element 4 has a wall structure of noise protection wall modules between steel uprights 30 such as, for example, a noise protection wall with solar modules placed thereon or integrated. The steel uprights 30 are anchored in a foundation block 27 in each case. The wall element 4 is continued underneath the upper edge 21 of the solar modules 10. The wall element 4 forms noise protection surfaces 15, 15' above and below the upper edge 21. The solar modules 10 are arranged in rows 31, wherein horizontal transverse struts 32 support the rows 31 between the outriggers 7.

Figure 4:
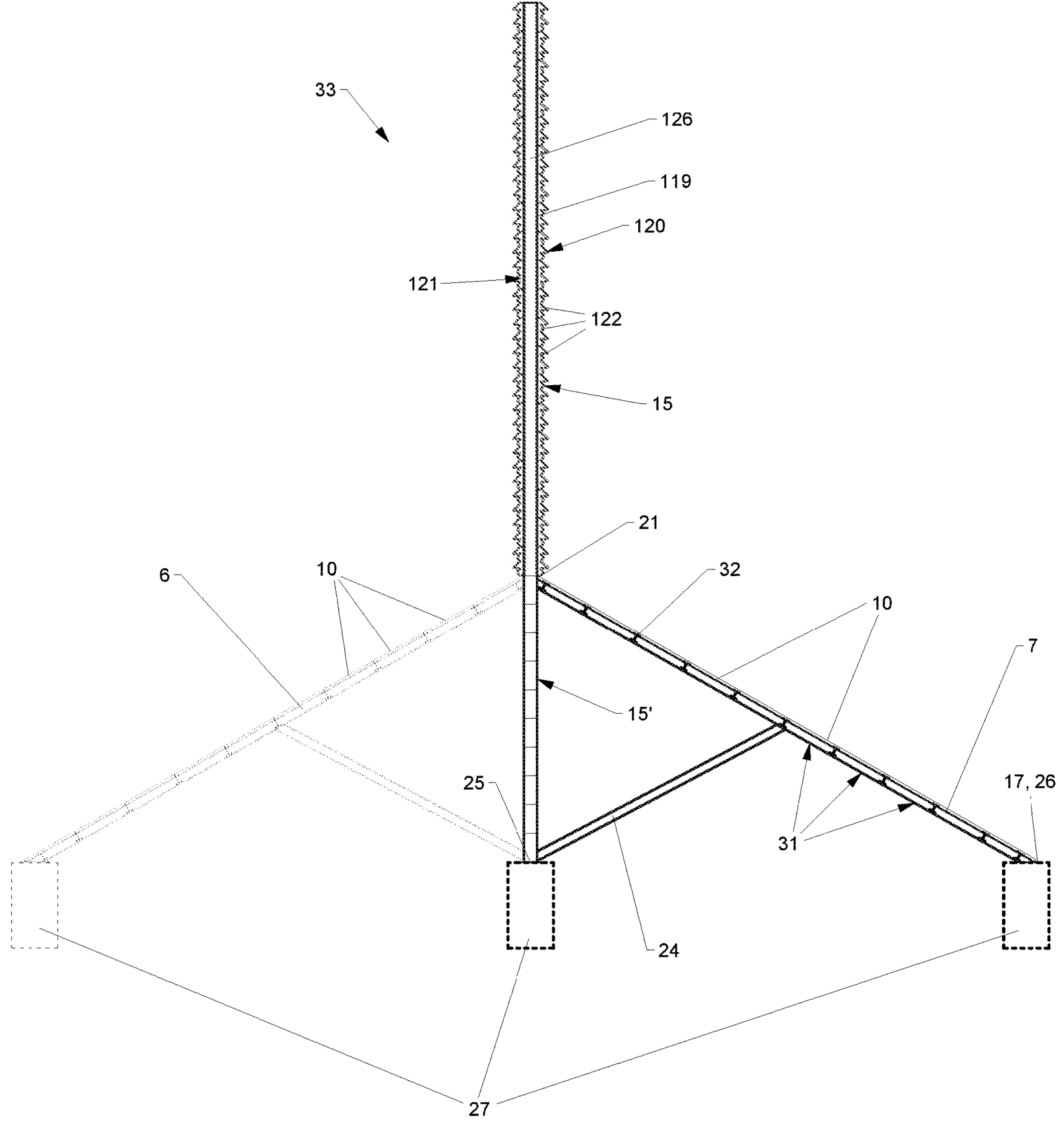
FIG. 4 and FIG. 5 show schematically a system section and a diagrammatic view of a strut of an alternative noise protection wall arranged on one or both sides as a substructure of solar modules, wherein the noise protection wall comprises a plurality of profile elements.
Figure 5:
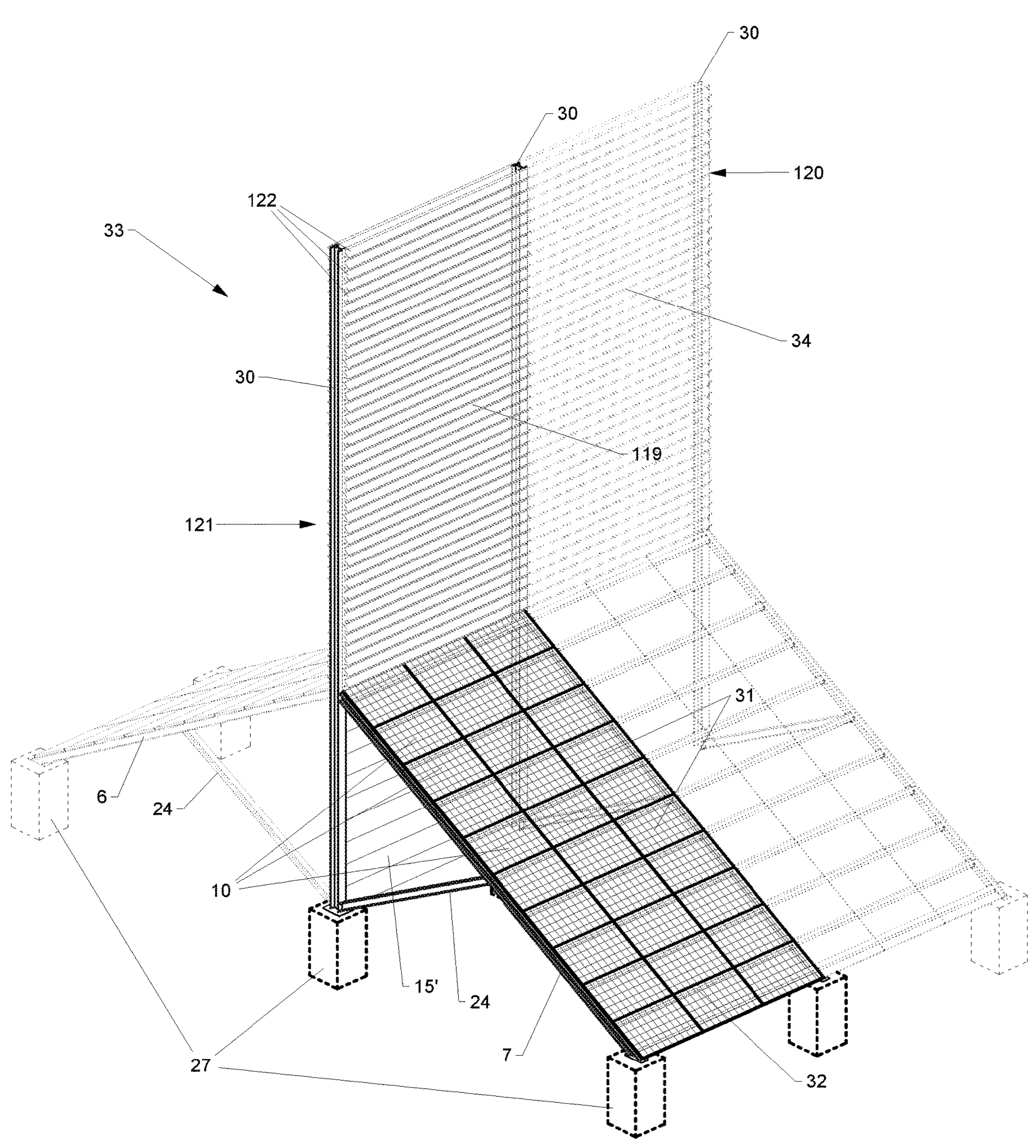

FIG. 4 and FIG. 5 show a noise protection device 33 with a wall element 119 (and an adjacent wall element 34), in which on both sides 120, 121 a plurality of profile elements 122 are arranged vertically above one another. The individual profile elements 122 are constructed of two modules 123, 124 (cf. FIG. 8), wherein the individual modules 123, 124 each correspond to a profile element 101 according to the embodiment according to FIG. 6 and FIG. 7, and the two modules 123, 124 comprise a common continuous body 125 so that two modules 123, 124 together form a profile element 122 (with corresponding two solar modules). The wall element 119 comprises a supporting core 126, e.g. made of reinforced concrete or a framework lightweight construction between steel uprights (distance between uprights e.g. 165, 200 or 500 cm) as well as a foundation block 27 of concrete. With regard to the outrigger 7 (and optionally the rear-side outrigger 6), the construction of the noise protection device 33 corresponds to that of the noise protection device 2 so that the same reference numbers are used for these parts and reference is made to the above description.

Figure 6:
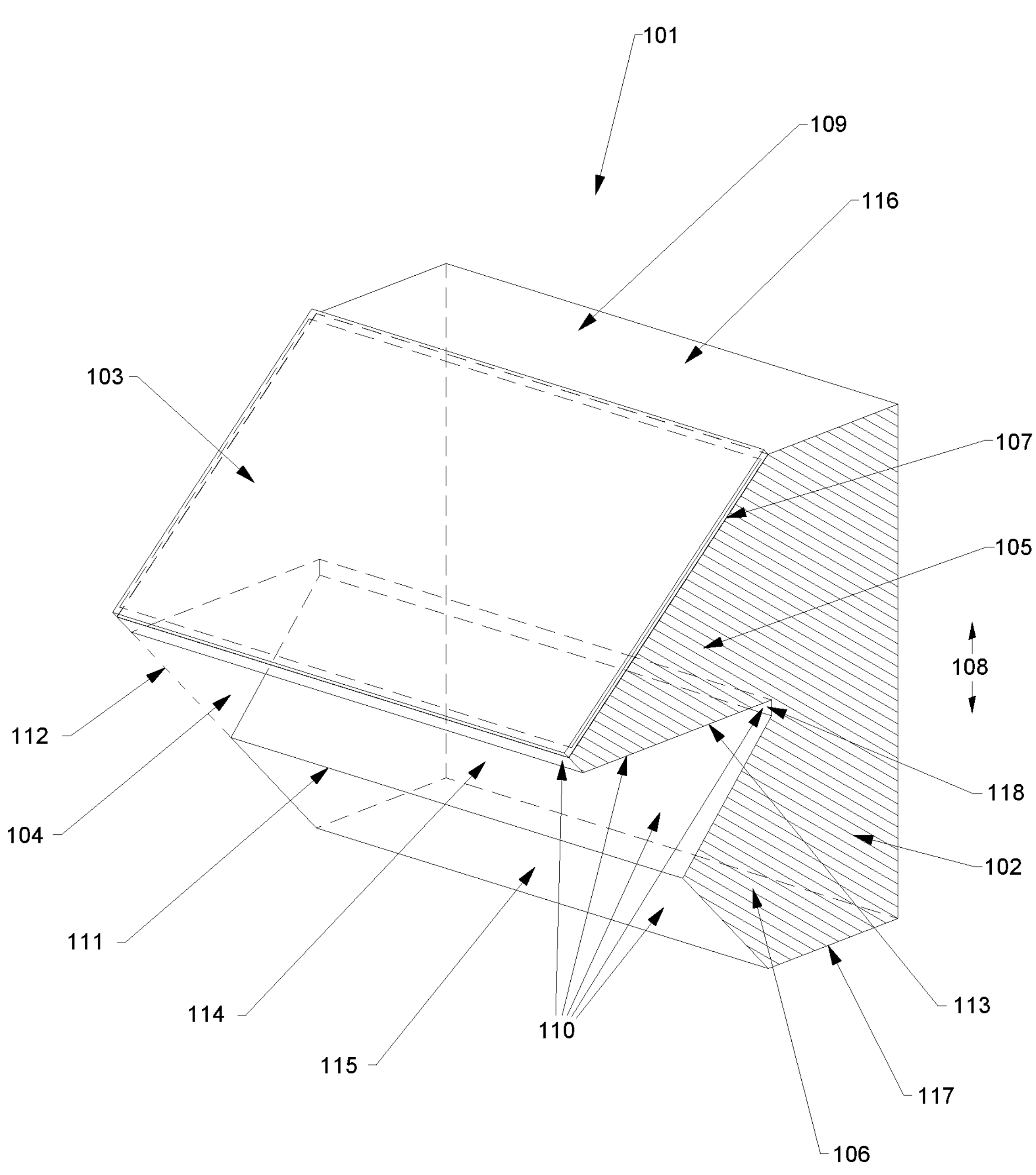
FIG. 6 shows a diagrammatic view of a first embodiment of an exemplary profile element for the application according to FIGS. 4 and 5.

The profile elements 122 carry additional solar modules 103 (cf. FIG. 6) in the region of the noise protection surface 15 (cf. FIG. 6). The distance between adjacent additional solar modules 103 of the wall element 119 in the direction of the vertical is selected so that the shadow line 112 between these solar modules 103 is substantially normal to the outer side of the solar modules 103 arranged parallel in this example. In a side view of the outer side 104 (not shown but identifiable from the depicted profile), the distance between adjacent solar modules 103 (for example, 14 cm) in the direction of the vertical is greater than or equal to the distance between an upper edge 128 and a lower edge 129 of a solar module 103 (for example, 11 cm). The sound absorption surfaces 110 of the profile elements 122 are each arranged completely within a shadow line 112 between an upper edge 128 of a lower additional solar module 103 and a lower edge 129 of an upper additional solar module 103.

The profile elements 122 (with a module height of, for example, 25 cm and a corresponding element height of, for example, 50 cm) are stacked so that they contact the bearing surfaces 116, 117 of adjacent profile elements 122. The width of the solar modules 103 is, for example, 16.5 cm. The individual profile elements 122 are connected to the supporting core 126, for example, adhesively bonded or screwed on.

FIG. 5 shows a diagrammatic view of a wall element 119 with profile elements 122 arranged on both sides according to FIG. 4. The noise protection device 33 has a plurality of wall elements 119, 34 in the longitudinal direction which are each delimited by steel uprights 30, supported and anchored in the ground with foundation blocks 27.

Figure 7:
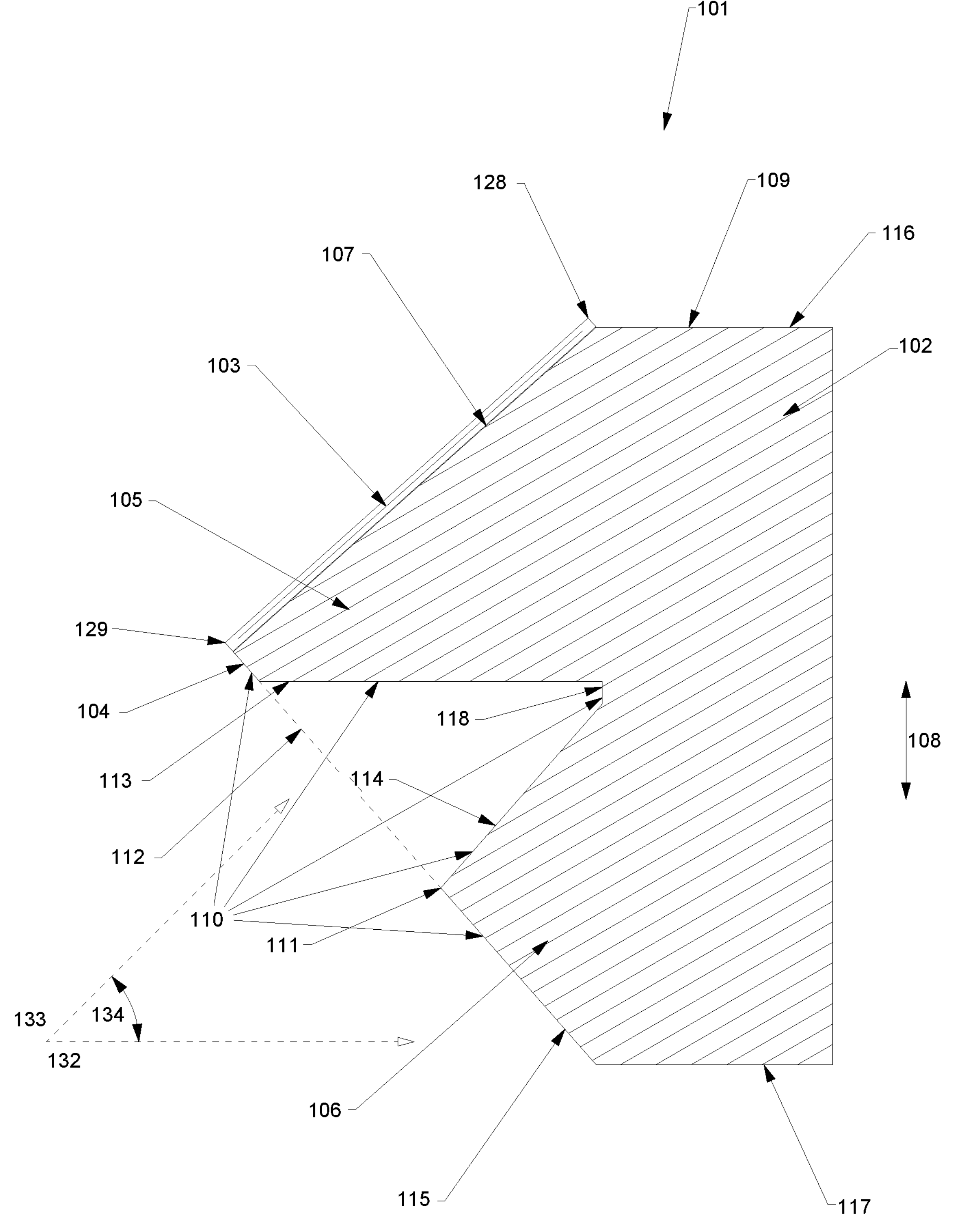
FIG. 7 shows schematically a vertical section of the profile element according to FIG. 6.

FIG. 6 and FIG. 7 show a simpler (half as high) profile element 101 for a wall element 119 according to FIGS. 4 and 5. The profile element 101 comprises a body 102 made of wood concrete and an ("additional" in connection with the entire noise protection device 33) solar module 103. The profile element 101 has an outer side 104 (also front side). The body 102 has two elevations 105, 106 or projections on the outer side 104. The first elevation 105 forms a support 107 towards the outer side 104 on which the solar module 103 is arranged and connected to the body 102. The solar module 103 is inclined in relation to a vertical 108 in the direction of an upper side 109 of the profile element 101.

In addition, on the outer side 104 the body 102 has a sound absorption surface 110 that can be reached directly for incoming sound from a noise immission range corresponding to an angular range 134 from normal (i.e. parallel to the normal 132) or up to an inclination 133 of 45° under the normal 132 to the vertical 108. The second elevation 106 is arranged outside the solar module 103, more precisely remote from or adjacent to the solar module 103 and serves to enlarge the sound absorption surface 110, wherein an outer edge 111 of the elevation 106 contacts a shadow line 112 underneath the solar module 103 so that the elevation 106 comes to lie inside the shadow line. The sound absorption surface 110 is completely concealed by the solar module 103 in a viewing direction normal to the solar module 103.

As a result of the geometry of the second elevation 106 (with a triangular profile), the sound absorption surface is substantially divided into three sections 113, 114 and 115 which are inclined or normal in relation to the vertical 108 of the profile element 101. The area of the sound absorption surface 110 is greater than the area of an elevation view of the profile element 101, e.g. by about 1.2 times.

The body 102 has an upper bearing surface 116 and a lower bearing surface 117 for stacking a plurality of profile elements 101 in a stacking direction. The bearing surfaces 116, 117 are for the most part arranged substantially normally to the vertical 108.

In the possible embodiment described, in addition to the three inclined or horizontal sections 113, 114 and 115, the sound absorption surface 110 also has a fourth section 118 arranged parallel to the vertical between the two elevations 105, 106 which is intended to avoid the possibly problematic acute angle during manufacture between the two elevations 105, 106. For the same reason the tip (outer edge) of the first elevation 105 is chamfered.

Figure 8:
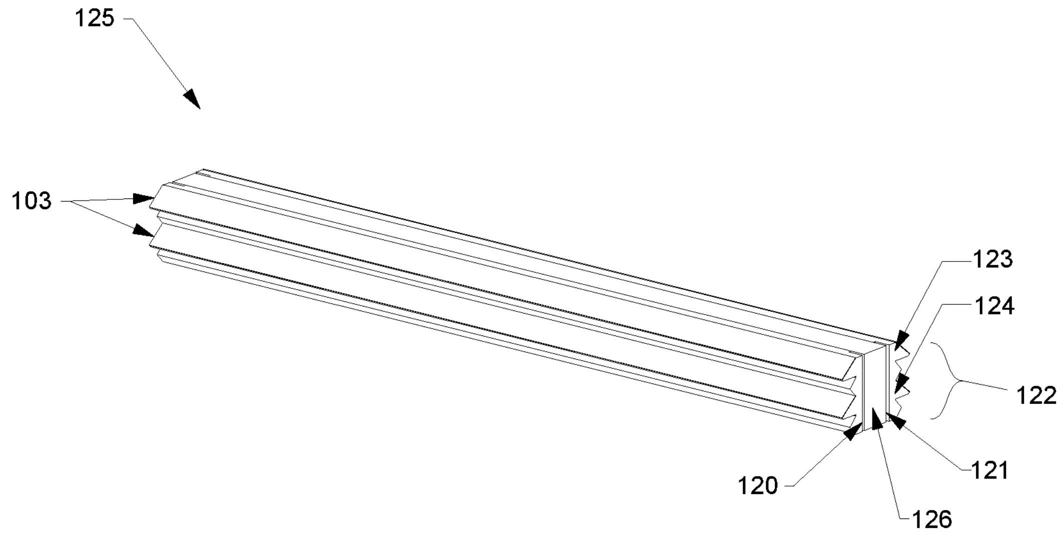
FIG. 8 shows a diagrammatic view of a wall module for the application according to FIGS. 4 and 5 with profile elements arranged on both sides.

FIG. 8 shows schematically a section of the wall element 119 according to FIGS. 4 and 5 corresponding to a wall module. The wall module comprises a section of the core 126. Respectively one profile element 122 with a continuous body 125 is arranged on both sides 120, 121 of the core section. Each profile element here comprises two modules 123, 124 which are each equipped with a solar module 103. The wall module shown here, for example, has dimensions along the vertical 108 (height) of about 50 cm. Each module 123, 124 or module row is therefore about 25 cm high. The solar modules 103 here are about 16.5 cm wide. Alternatively it can be provided that a wall module of this height has three module rows, wherein the solar modules have a width of about 12.5 cm. However, it is also feasible to provide a wall module with only one module row, e.g. with a height of 25 cm.

The invention claimed is:

1. A noise protection device located upon a supporting surface and comprising a wall element arranged substantially perpendicular to said supporting surface, at least one outrigger emanating from the wall element and at least one solar module supported by the outrigger, wherein the outrigger laterally supports the wall element, wherein the wall element forms a noise protection surface above an upper edge of the at least one solar module, wherein the noise protection surface is configured as a sound absorption surface and extends upwards from an upper edge of the at least one solar module, wherein the outrigger and the at least one solar module supported by the outrigger are arranged on a same side of the noise protection device that forms the noise protection surface.

2. The noise protection device according to claim 1, wherein the noise protection surface extends upwards substantially perpendicularly to said supporting surface, starting from the upper edge of the at least one solar module.

3. The noise protection device according to claim 2, wherein a height of the noise protection surface above the upper edge of the at least one solar module is at least as great as a vertical distance between a lower edge of the at least one solar module and the upper edge of the at least one solar module.

4. The noise protection device according to claim 3, wherein the height of the noise protection surface above the upper edge of the at least one solar module is approximately twice as great as the vertical distance between a lower edge of the at least one solar module and the upper edge of the at least one solar module.

5. The noise protection device according to claim 1, wherein the at least one outrigger encloses an angle of about 60° with a principal plane of extension of the at least one wall element.

6. The noise protection device according to claim 1, wherein the noise protection device comprises at least two outriggers emanating from the wall element, wherein the outriggers support the wall element on both sides.

7. The noise protection device according to claim 6, wherein the outriggers support solar modules on both sides of the wall element.

8. The noise protection device according to claim 1, wherein at least one of the outriggers comprises a strut to a foot of the wall element.

9. The noise protection device according to claim 8, wherein the strut starts from a centre of the outrigger.

10. The noise protection device according to claim 1, wherein the wall element supports at least one additional solar module in a region of the noise protection surface.

11. The noise protection device according to claim 10, wherein the wall element in the region of the noise protection surface comprises a profile element, wherein the profile element comprises a body and has at least one outer side, wherein the body has a support towards the at least one outer side, wherein the at least one additional solar module is disposed on the support and is connected to the body, wherein the at least one additional solar module is inclined in relation to a vertical in the direction of an upper side of the profile element, wherein on the at least one outer side the body has at least one sound absorption surface which can be reached directly for incoming sound, wherein the sound absorption surface, at least on sections, is inclined in relation to the vertical and/or in relation to a longitudinal direction of the profile element, wherein an area of the sound absorption surface is at least as large as an area of an elevation view of the profile element.

12. The noise protection device according to claim 11, wherein the area of those sections of the sound absorption surface which can be reached directly for sound arriving from a noise immission range is at least as large as the area of an elevation view of the profile element, wherein the noise immission range comprises an angular range between a normal to the vertical and an inclination set at 70° from this normal in the direction of an underside of the profile element.

13. The noise protection device according to claim 11, wherein the area of the sound absorption surface corresponds to approximately 1.2 times or multiple times the area of an elevation view of the profile element.

14. The noise protection device according to claim 11, wherein the body comprises an upper bearing surface and a lower bearing surface for stacking a plurality of profile elements in a stacking direction, wherein the bearing surfaces are arranged at least partially substantially normal to the vertical.

15. The noise protection device according to claim 11, wherein the sound absorption surface in a viewing direction normal to the at least one additional solar module is concealed by the at least one additional solar module at least for the most part.

16. The noise protection device according to claim 11, wherein in a noise protection wall comprising the profile element the sound absorption surface is disposed completely within a shadow line between an upper edge of a lower additional solar module and a lower edge of an upper additional solar module.

17. The noise protection device according to claim 16, wherein the body comprises at least one elevation to enlarge the sound absorption surface on the at least one outer side outside the at least one additional solar module, wherein an outer edge of the elevation contacts the shadow line or lies inside the shadow line.

18. The noise protection device according to claim 16, wherein a distance between adjacent additional solar modules of a noise protection device comprising the profile element in the direction of the vertical is selected so that the shadow line between these adjacent additional solar modules is disposed substantially normally on a front side of the at least one additional solar module.

19. The noise protection device according to claim 11, wherein in a side view of the outer side a distance between adjacent solar modules in the direction of the vertical is greater than or equal to a distance between an upper edge and a lower edge of the at least one additional solar module.

20. The noise protection device according to claim 1, wherein a body of the wall element in a region of the noise protection surface substantially comprises a sound absorbing material.

21. The noise protection device according to claim 20, wherein a body of the wall element in the region of the noise protection surface substantially consists of a sound-absorbing material.

22. A noise protection system comprising:

the noise protection device according to claim 1, and an additional wall element with an additional noise protection surface and an additional solar module, wherein the noise protection surface of the noise protection device and the additional noise protection surface are both arranged substantially perpendicularly to said supporting surface, wherein the additional wall element is disposed at a distance from the noise protection device, wherein a height difference between a lower edge of the at least one solar module of the noise protection device and an upper edge of the additional wall element is less than 0.6 times or equal to 0.6 times a horizontal distance between the same edges and/or a height difference between a lower edge of the additional solar module and an upper edge of the noise protection device is less than 0.6 times or equal to 0.6 times the horizontal distance between the same edges.

23. The noise protection system according to claim 22, wherein a larger of the two height differences approximately corresponds to 0.6 times the associated horizontal distance.

* * * * *